United States Patent [19]
Brunner et al.

[11] Patent Number: 5,446,606
[45] Date of Patent: Aug. 29, 1995

[54] DISC DRIVE WITH SEPARATE LANDING AND TAKEOFF ZONES

[75] Inventors: Mark Brunner, Eden Prairie; Jonathan Hall, Bloomington; Garry Korbel, New Prague, all of Minn.

[73] Assignee: Seagate Technology, Inc., Scotts Valley, Calif.

[21] Appl. No.: 196,911

[22] Filed: Feb. 15, 1994

Related U.S. Application Data

[63] Continuation of Ser. No. 958,559, Oct. 8, 1992, abandoned.

[51] Int. Cl.⁶ .............................................. G11B 21/00
[52] U.S. Cl. .................................. 360/75; 360/78.04
[58] Field of Search ............................. 360/75, 78.04

[56] References Cited

U.S. PATENT DOCUMENTS

| | | | |
|---|---|---|---|
| 4,542,429 | 9/1985 | Nishida et al. | 360/105 |
| 4,833,550 | 5/1989 | Takizawa et al. | 360/75 |
| 4,897,743 | 1/1990 | Kohno | 360/75 |
| 4,907,106 | 3/1990 | Yamada | 360/75 |
| 5,043,834 | 8/1991 | Kubo et al. | 360/105 |
| 5,144,504 | 9/1992 | Kitazawa | 360/78.04 |
| 5,172,287 | 12/1992 | Ishida | 360/105 |
| 5,303,100 | 4/1994 | Nakayama et al. | 360/75 X |

Primary Examiner—Aristotelis Psitos
Assistant Examiner—James T. Wilson
Attorney, Agent, or Firm—Kinney & Lange

[57] ABSTRACT

Two data-free tracks, a takeoff zone and a landing zone, are provided on a magnetic disc, in order to provide a place for the magnetic head to come in contact with the disc without risk of destruction of data. An actuator controller places the head on the takeoff zone at the start of the disc's rotation and on the landing zone at the finish of the disc's rotation. Wear caused by contact of the head with the disc is thereby distributed over two zones, which prolongs the life of the disc.

11 Claims, 5 Drawing Sheets

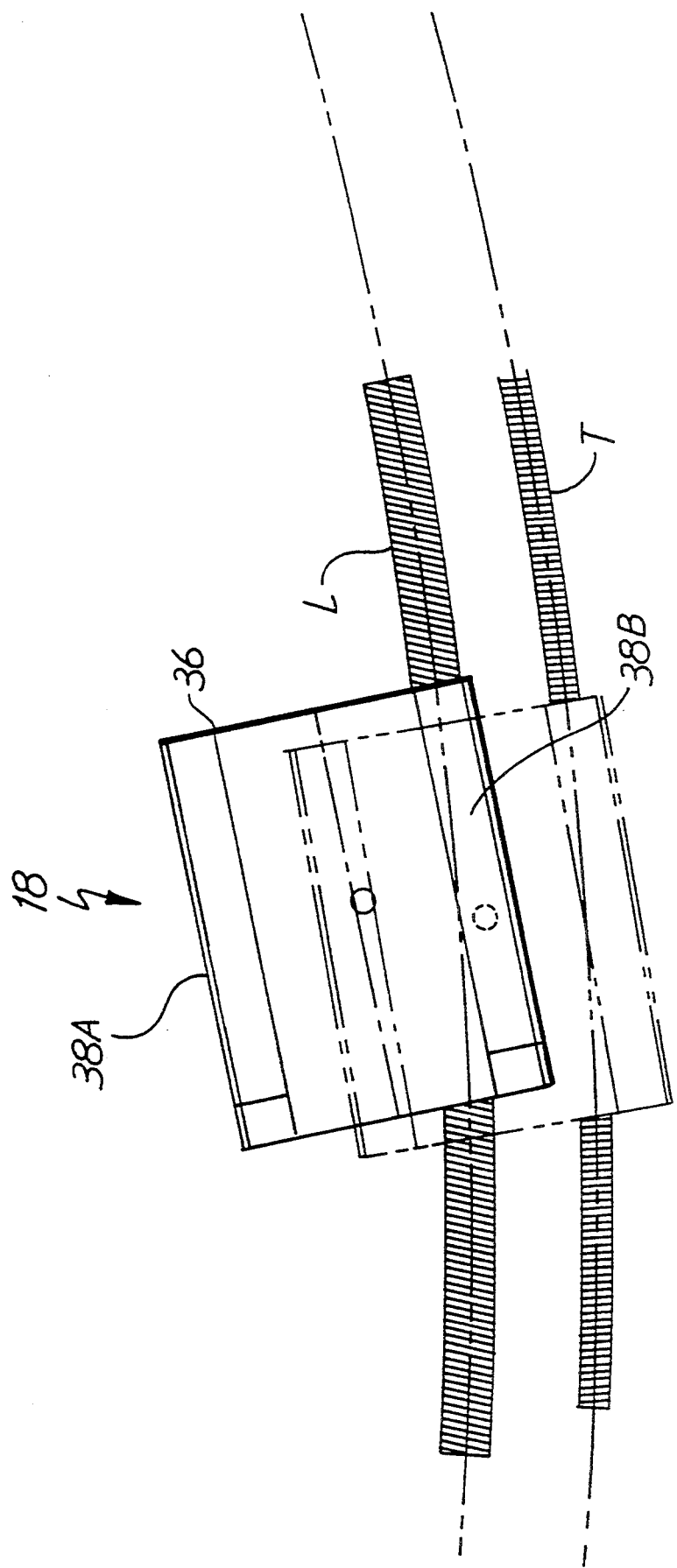

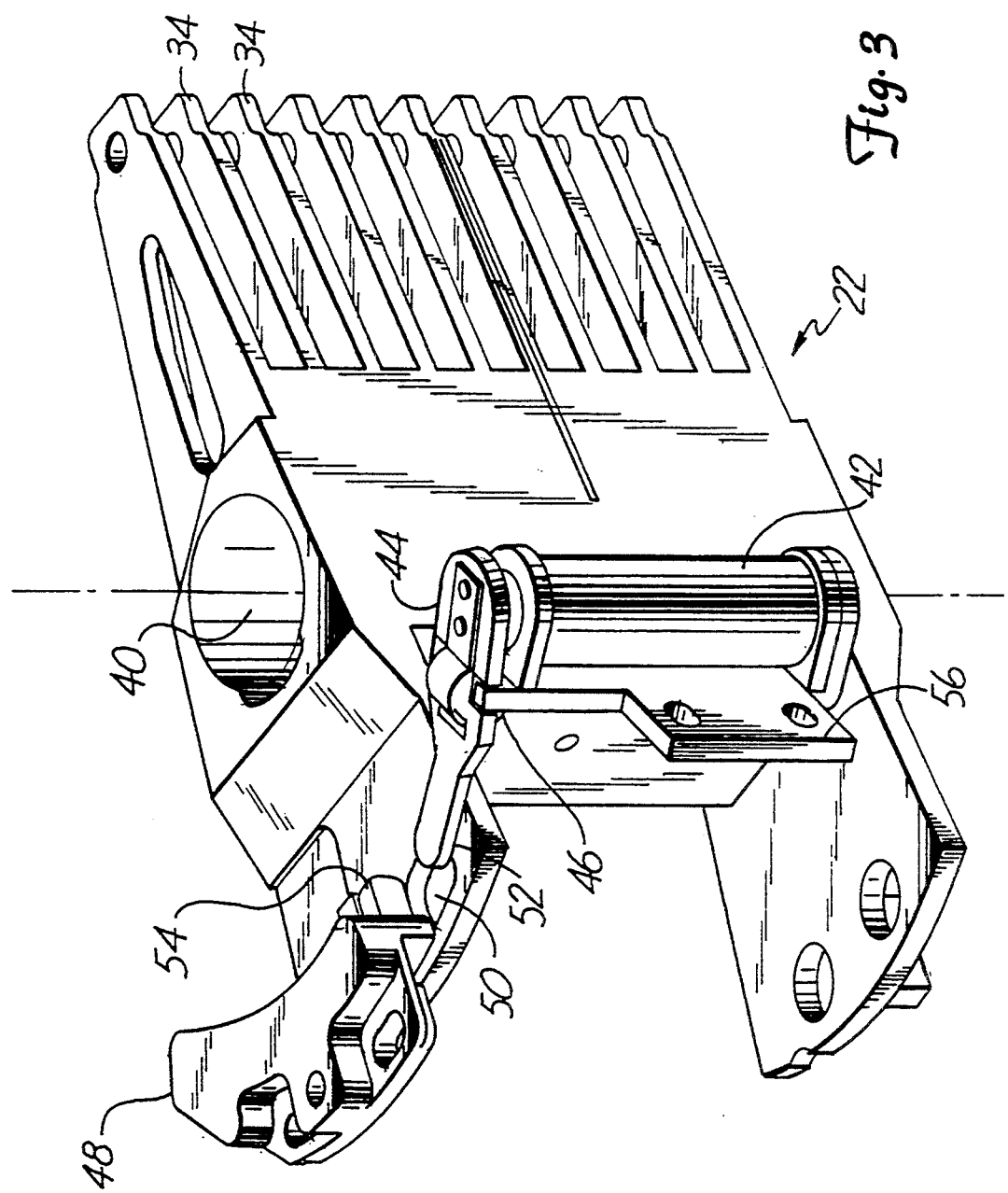

DISC DRIVE WITH SEPARATE LANDING AND TAKEOFF ZONES

This is a continuation of application Ser. No. 07/958,559, filed Oct. 8, 1992 now abandoned.

BACKGROUND OF THE INVENTION

This invention relates to a method and apparatus for moving the read/write head of a magnetic disc drive between a takeoff and a landing zone on the magnetic disc when the disc is starting and stopping. Wear resulting from contact of a head on a disc is thus spread over two regions, thereby slowing the rate at which wear accumulates in either region.

Disc drive heads fly on a thin film of air and do not contact the rotating disc they are flying over. During starting and stopping, and while the disc is stopped, the heads do come in contact with the disc. Contact of the heads with the disc causes wear. If the heads make contact with a portion of the disc that contains data, the eventual result is destruction of that data.

To prevent the possibility of destruction of data by the head, a dedicated track can be reserved on the disc for contact by the head. The location contains no data, and therefore does not present the risk of loss of data. To save valuable space on the disc, the dedicated track is made as narrow as possible. This has the effect of concentrating the disc wear caused by the heads in a very narrow band defined by the width of the rails on the recording head.

The use of a single narrow dedicated track prevents destruction of data due to contact of the disc by the head, and the narrowness of the track minimizes the area of the disc that cannot carry data. However, restricting contact of the heads with the disc to a single area concentrates all the wear of the disc by the heads to that area. Only one area of the disc is subject to wear, but that area is subjected to a much greater rate of wear than if the wear were distributed over a greater portion of the disc. The concentration of wear that occurs when the heads are restricted to contact with a single small area of the disc limits the number of cycles the disc drive can sustain before the disc media fails.

Dedication of a landing zone allows that a certain degree of wear can be tolerated. This is true because no data is present on the dedicated landing zone, and therefore the wear to which the dedicated landing zone is subject will not destroy any data. Nevertheless, wear of the dedicated landing zone will eventually render the disc unusable. As the landing zone wears, it becomes more and more irregular. The recording head must contact the landing zone; therefore, as the landing zone becomes more worn, the irregularity of the landing zone subjects the recording head to a greater rate of wear, an increased contamination risk, and other negative effects. It therefore becomes desirable to reduce the wear to which the landing zone is subjected.

One approach to distributing wear more evenly over the disc is to use a loose latch where the actuator latching mechanism has surfaces that permit the actuator a degree of freedom in starting or stopping. This permits a degree of randomness in location of contact of the disc by the head, thus distributing the wear more evenly and lengthening the life of the disc. This technique does not achieve even distribution, however, because of two factors.

The first factor is that the flexible actuator does not provide an equal probability for starting and stopping at all possible locations. Rather, the starting and stopping locations are distributed according to a Gaussian curve. The wear is thus concentrated near the center of the curve. The second factor is that during the time the disc is rotating, the actuator is subjected to forces that tend to bias the actuator against one side of the start/stop band. This further concentrates wear on that side.

U.S. Pat. No. 4,897,743, issued Jan. 30, 1990 to Kohno, discloses a control system for moving the heads at startup of the disc drive. When the disc drive unit is turned on, the disc drive motor and the actuator control is directed to move the head. Because the inertia of the disc is relatively large, there is a delay before the rotation of the disc begins. By moving the heads prior to disc rotation, Kohno may damage the head, disc, or flexible load beam. The actuator control responds more quickly and moves the head before the rotation of the disc begins.

The Kohno patent moves the head in order to break the adhesion of the head to the disc to prevent damage to the head or the disc once rotation begins. It is not important to the operation of the Kohno patent to place the head in any particular position.

SUMMARY OF THE INVENTION

This invention uses electronic control to command the actuator to two defined zones during starting and stopping of the disc. The starting (takeoff) and stopping (landing) zones are different; therefore, each zone is subject to only half the wear of a single zone. The invention includes a disc having a recording zone within which data is recorded, a landing zone, and a takeoff zone next to the landing zone. The invention includes a read/write head for reading and writing data, an actuator for positioning the head, and an actuator control for providing signals to move the read/write head to the landing zone as the rotation of the disc stops and to move the head to the takeoff zone as the rotation of the disc starts. When the discs are being stopped, the actuator control causes the actuator to move so as to place the read/write head on the landing track of the disc. After the disc has stopped, the actuator control latches the actuator and the friction between the head and the disc holds the head in place.

When the disc is started, power is applied to the spindle drive motor and the discs begin to rotate. When rotation is detected, the actuator control moves the actuator so as to position the head in the starting band. The actuator is not moved until rotation is detected.

When the disc has reached operating speed, the actuator is unlatched, and the head and actuator can be moved to access the tracks of the disc to read and write data.

BRIEF DESCRIPTION OF THE DRAWINGS

FIG. 2A is a closeup view of the takeoff and landing zones of a disc of the present invention, showing the recording head in relation to the takeoff and landing zones.

FIG. 3 is a perspective view of the actuator of a disc drive of the present invention.

DETAILED DESCRIPTION OF THE PREFERRED EMBODIMENTS

Figure 1:
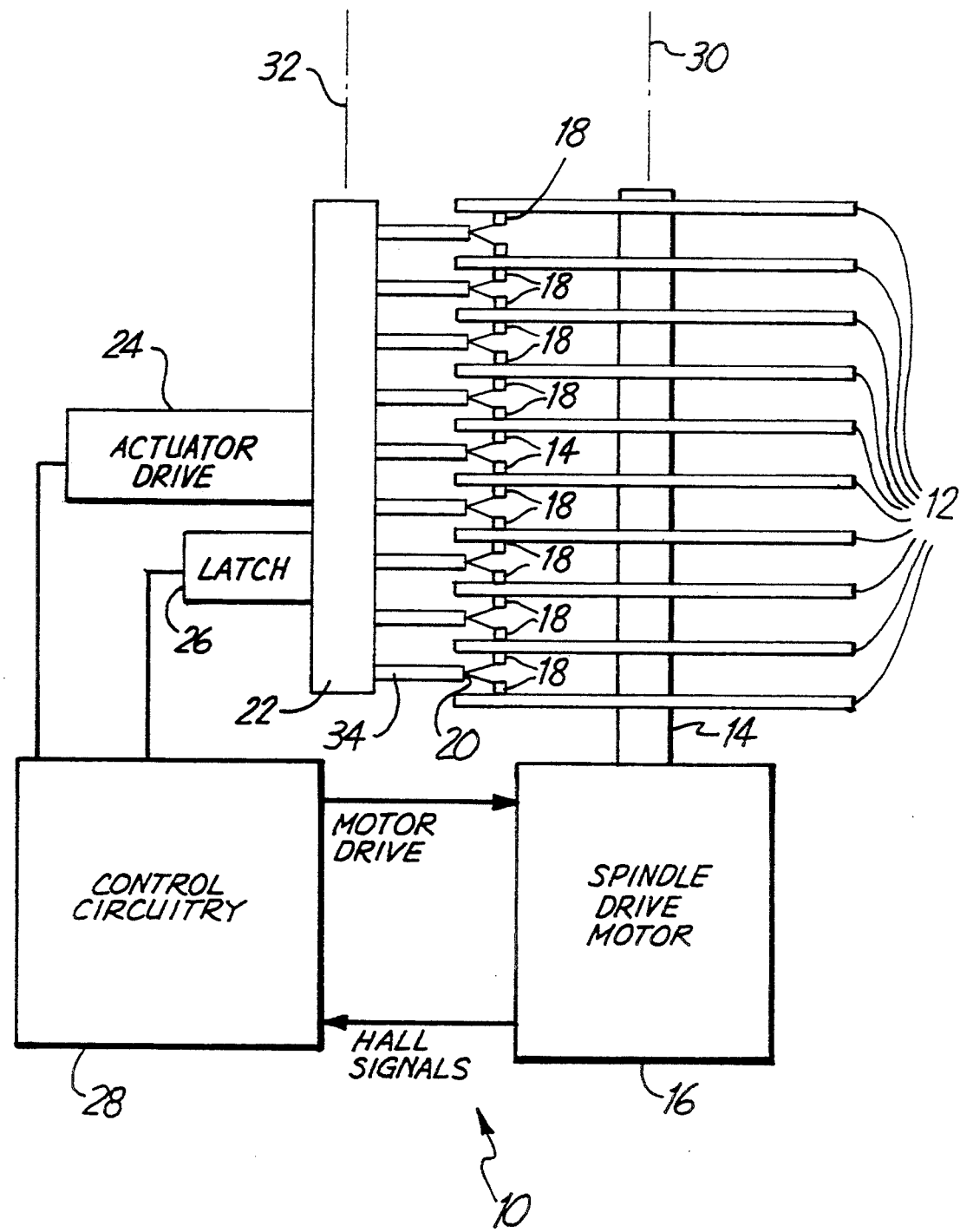
FIG. 1 is a block diagram of a disc drive of the present invention.

FIG. 1 is a diagram of disc drive 10. Disc drive 10 includes magnetic discs 12, spindle 14, spindle drive motor 16, magnetic heads 18, support arms 20, E-block carriage 22, actuator drive 24, carriage latch 26 and control circuitry 28.

Magnetic discs 12 are mounted on spindle 14, which is rotated about spindle axis 30 by spindle drive motor 16. Operation of spindle drive motor 16 is controlled by control circuitry 28.

E-block 22 is pivotable about actuator axis 32, which is parallel to spindle axis 30. E-block 22 has a plurality of parallel actuator arms 34. Support arms 20 are flexible load beams which are attached at one end to actuator arms 34 of E-block 22. Magnetic read/write heads 18 are attached to the opposite ends of support arms 20 by a gimbal arrangement (not shown). In preferred embodiments, each read/write head 18 includes an air bearing slider 36 (FIGS. 2 and 2A) which carries magnetic transducers for magnetically reading and writing data.

Actuator drive 24 controls the position of E-block 22 about actuator axis 32. Different tracks on disc pack 12 are accessed by heads 18 by pivoting E-block 22 about actuator axis 32. Operation of actuator drive 24 is controlled by actuator control signals from control circuitry 28.

Carriage latch 26 holds E-block 22 within a predetermined range of positions when disc drive 10 is not in operation. This range of positions, in the present invention, include separate landing and takeoff zones. Operation of carriage latch 26 is controlled by control circuitry 28.

For simplicity, further description will describe the operation of disc drive 10 as if it contained a single disc 12, actuator arm 34, support arm 10 20, and magnetic head 18. All discs 12 attached to spindle 17 operate in unison; and all actuator arms 34, support arms 20 and head 18 attached to E-block 22 operate in unison.

Figure 2:
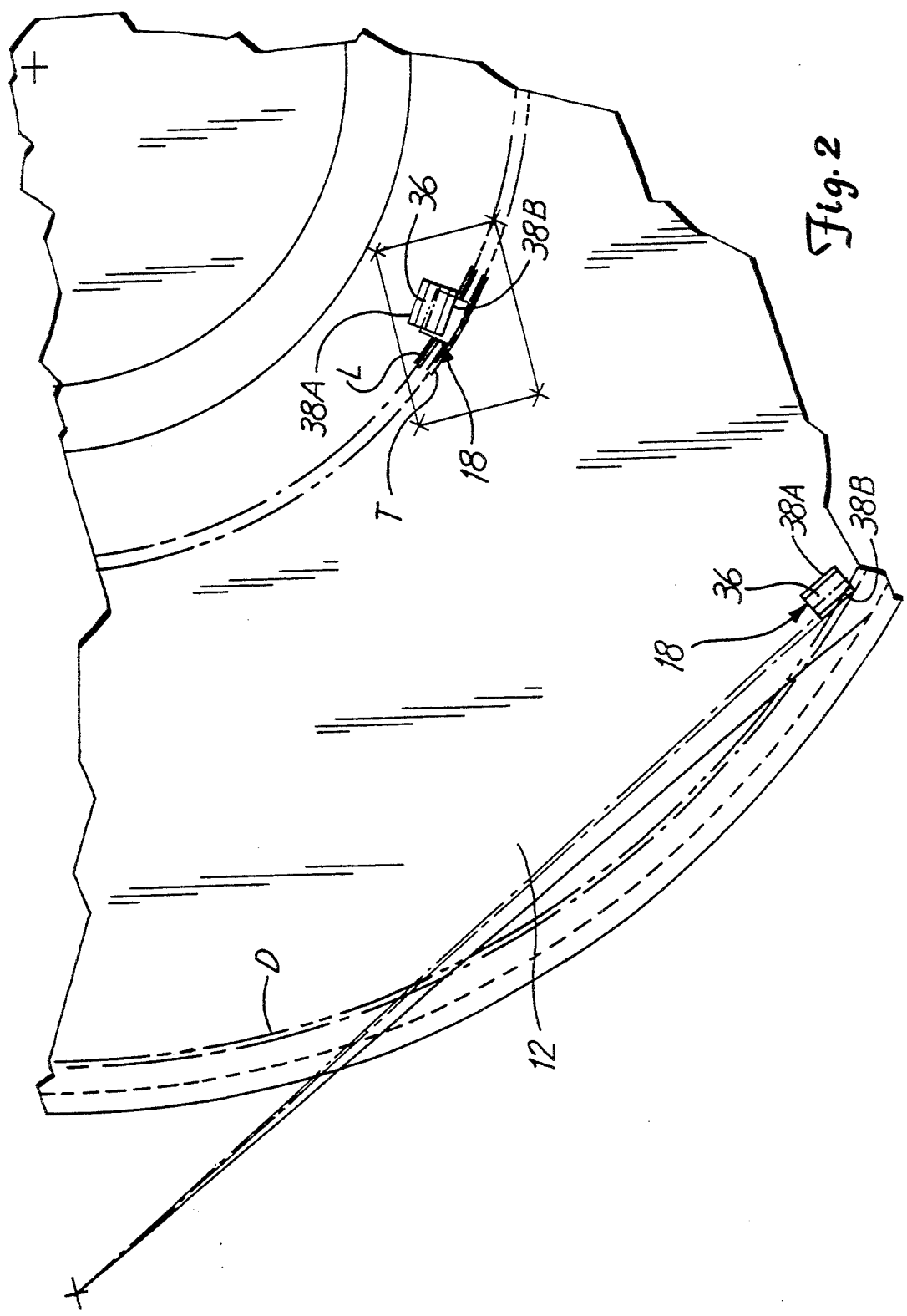
FIG. 2 is a view of a disc of the present invention, showing the takeoff and landing zones and the recording head.

FIG. 2 is a top view of disc 12, showing the locations of takeoff zone T and landing zone L, and a representative data track D, as well as the relative size and position of slider 36 and recording head 18, as compared to disc 12. In a preferred embodiment, takeoff zone T and landing zone L are concentrically positioned around the inner circumference of each magnetic disc 12. Takeoff zone T and landing zone L contain no data because repeated contact by magnetic head 18 would eventually destroy any data stored in takeoff zone T or landing zone L.

When disc drive 10 is inactive, disc 12 is not rotating, and head 18 is resting against the surface of disc 12 in landing zone L. When disc drive 10 is started, control circuitry 28 supplies motor drive signals to spindle drive motor 16, which causes drive spindle 14 and disc 12 to rotate. Control circuitry 28 monitors Hall signals generated by Hall sensors (not shown) internal to spindle drive motor 16. When rotation of spindle 14 is detected, control circuitry 28 causes actuator drive 24 to move E-block 22 so that magnetic head 18 moves from landing zone L to takeoff zone T. It is important to wait until after rotation of disc 12 is detected, because the movement of head 18 would otherwise impose excessive side loading on head 18. At sufficiently high speeds, the rotation of disc 12 causes head 18 to lift off the disc surface due to the aerodynamic properties of head 18. At that point, control circuitry 28 releases latch 26, which allows E-block 22 a full range of motion. After takeoff, head 18 flies over the surface of disc 12 as disc 12 rotates. Control circuitry 28 supplies actuator drive signals to rotate E-block 22 in order to position head 18 over disc 12 as required to read and write data in appropriate locations (such as data track D).

When disc drive 10 is turned off, control circuitry 28 issues a command to actuator drive 24 to move E-block 22 so that head 18 approaches landing zone L. As the rotational speed of disc pack 12 decreases, magnetic head 18 descends to landing zone L. Control circuitry 28 latches latch 26 to restrict the range of motion of E-block 22, and defines the location of landing zone L at one end of the range of positions permitted by latch 26.

By separately using takeoff zone T and landing zone L, disc drive 10 achieves a lifetime twice that of disc drives of the prior art. By moving head 18 after rotation has begun, disc drive 10 reduces stiction between disc 12 and head 18. By waiting until rotation of disc 12 is detected, disc drive 10 avoids the imposition of excessive side loads on head 18.

FIG. 2A is a closeup view of the area of disc 12 containing takeoff zone T and landing zone L, showing the position and orientation of slider 36 with respect to takeoff zone T and landing zone L. Slider 36 is of a catamaran design, featuring a pair of self-acting hydrodynamic air bearing rails, which consist of inner rail 38A and outer rail 38B. When disc 12 is stopped, slider 36 rests on landing zone L.

FIG. 3 is a perspective view of E-block 22 showing the latching mechanism that allows precise positioning of magnetic head 18 on takeoff zone T and landing zone L of disc 12 and the crash stop which accurately positions the head on landing zone L of disc 12. E-block 22 includes actuator arms 34, axle hole 40, solenoid 42, latch 44, latch hinge 46, crash stop 48, latch hole 50, latch pin 52, rubber stop 54 and flange 56. Axle hole 40 accommodates an axle (not shown) to allow E-block 22 to rotate about actuator axis 32 as required. Flange 56 is held in a fixed position, so as to hold latch 44 in a fixed position. Thus, when latch 44 is engaged by positioning latch pin 52 in latch hole 50, latch 44 will limit the movement of E-block 22.

When disc drive 10 is in a stopped condition, solenoid 42 is deactivated, causing latch 44 to pivot about latch hinge 46 so that latch pin 52 is in latch hole 50, latching E-block 22. Head 18 is held in the correct position by friction between disc 12 and head 18.

When power is applied to disc drive 10, power is also applied to spindle drive motor 16. Control circuitry 28 then waits for Hall sensors located in spindle drive motor 16 to send a signal indicating that disc rotation is detected. After receiving a signal that disc rotation is detected, control circuitry 28 causes actuator drive 24 to rotate E-block 22 clockwise to the end of its travel. Because solenoid 42 is not activated, latch pin 52 is in latch hole 50, restricting the movement of E-block 22. Rotating E-block 22 clockwise to the maximum extent permitted by latch pin 52 causes magnetic head 18 to be positioned on takeoff zone 28. As the rotational speed of disc 12 increases, airflow across head 18 increases, causing head 18 to rise above the surface of disc 12. When disc 12 has achieved operating speed, control circuitry 28 activates solenoid 42, causing latch 44 to pivot about latch hinge 46. Latch pin 52 is thus removed from latch hole 50, permitting E-block 22 its normal range of movement. Actuator drive 24 (under the control of control circuitry 28) is then able to move E-block 22 as required to perform read and write operations on disc 12.

It is important that control circuitry 28 wait until rotation of disc 12 is detected before moving E-block 22. If E-block 22 is moved while head 18 is resting on disc 12 and before rotation of disc 12 begins, a strong side loading force is imposed on head 18. This creates a risk of damage to head 18 or disc 12.

When power is removed from disc drive 10, energy stored in rotating disc drive 12 is used to keep solenoid 42 activated until actuator drive 24 causes E-block 22 to be positioned back into landing zone L and against crash stop 48. Then solenoid 42 is deactivated. Because solenoid 42 is deactivated, latch pin 52 is in latch hole 50, restricting the movement of E-block 22. Rotating E-block 22 counterclockwise to the maximum extent permitted by latch pin 52 causes magnetic head 18 to be positioned above landing zone L. As the rotational speed of disc 12 decreases, head 18 descends to the surface of disc 12. Head 18 is then held in place on landing zone L by friction between head 18 and disc 12.

Figure 4:
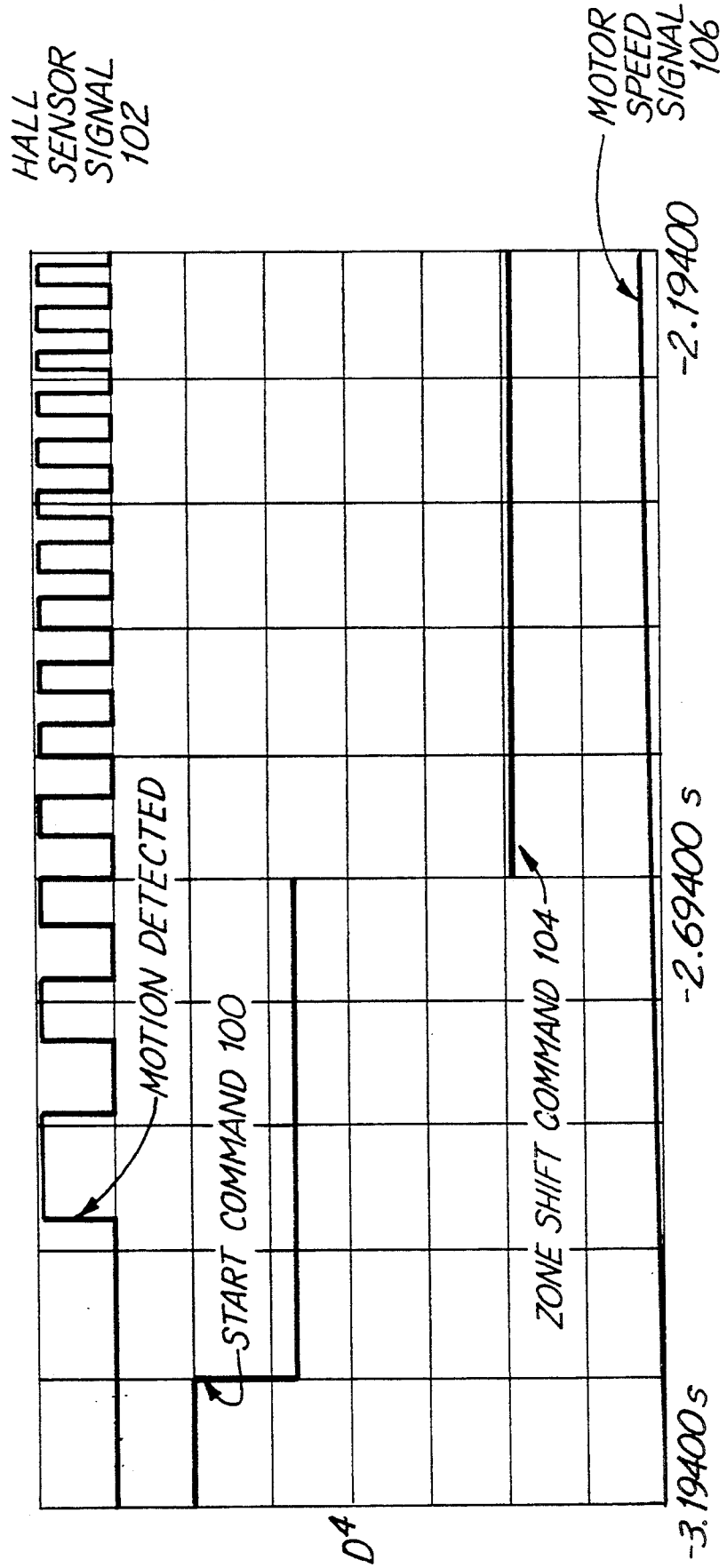
FIG. 4 is a timing diagram of the signals used to start a disc drive of the present invention and position the recording head.

FIG. 4 is a timing diagram of the signals passed between control circuitry 28, spindle drive motor 16 and actuator drive 24 during starting of disc drive 10. When disc drive 10 is started, control circuitry 28 issues start command 100 to spindle drive motor 16. After issuing start command, control circuitry 28 observes Hall sensor signal 102 from Hall sensors located in spindle drive motor 16. A positive-going edge of Hall sensor signal 102 indicates that motion of spindle drive motor 16 has been detected. Upon detecting a positive-going edge of Hall sensor signal 102, control circuitry 28 issues zone shift command 104 to actuator drive 24, causing actuator drive 24 to shift magnetic heads 18 from landing zone L to takeoff zone T. Control circuitry 28 also monitors motor speed signal 106. When motor speed signal 106 reaches a sufficient magnitude, indicating that spindle drive motor 16 has reached operating speed, control circuitry 28 activates solenoid 42, releasing latch 44 and allowing magnetic heads 18 to move freely.

By providing separate landing and takeoff zones for disc drive 10, the present invention reduces the rate of wear of each zone to half the rate of wear that would occur if a single zone were used for both takeoff and landing. The life of disc drive 10 is thus doubled. The effective cost of disc drive 10 to the user is therefore reduced, and the data stored on the disc drive is more secure.

Although the present invention has been described with reference to preferred embodiments, workers skilled in the art will recognize that changes may be made in form and detail without departing from the spirit and scope of the invention.

What is claimed is:

1. A disc drive comprising:
   a magnetic disc having a recording zone within which data is selectively recorded, a landing zone, and a separate takeoff zone;
   means for rotating the magnetic disc;
   disc drive data head means for reading data from and writing data to the recording zone;
   actuator means for positioning the disc drive data head means with respect to the magnetic disc, wherein the disc drive data head means is directed to initially contact the landing zone of the magnetic disc as the magnetic disc slows and the disc drive data head means is moved from the landing zone to the takeoff zone where the disc drive data head means loses contact with the accelerating magnetic disc, the disc drive data head means only sliding radially on the disc surface when moving from the landing zone to the takeoff zone during the transition to takeoff;
   actuator control means for controlling the actuator means; and
   sensing means for detecting rotation of the magnetic disc, wherein upon starting the rotation of the magnetic disc the disc drive data head means is moved from the landing zone to the takeoff zone when the sensing means detects rotation of the magnetic disc.

2. The disc drive of claim 1 further including latching means to restrict movement of the disc drive data head means to an area of the magnetic disc containing the takeoff and landing zones during starting and after a predetermined rotational speed of the magnetic disc has been reached as the magnetic disc decelerates.

3. The disc drive of claim 2, wherein the sensing means is a means for detecting the speed of rotation of the magnetic disc, wherein upon starting rotation of the magnetic disc, the disc drive data head means is moved from the landing zone to the takeoff zone when the sensing means detects a first preselected rotational speed of the magnetic disc and wherein the latching means is released to allow the head to move freely in response to signals from the actuator control means when the sensing means detects a second preselected rotational speed of the magnetic disc.

4. The disc drive of claim 1 including a plurality of takeoff and landing zone pairs, wherein each of the takeoff zones comprises a separate band and each of the landing zones comprises a separate band and wherein the disc drive data head means is directed to initially contact a selected one of the plurality of landing zones for landing and for takeoff the disc drive data head means is moved to the takeoff zone associated with the selected one of the plurality of landing zones.

5. The disc drive of claim 1 wherein in response to a stop disc command signal the actuator control means causes the actuator means to move the disc drive data head means towards the landing zone such that the disc drive data head means is in the same zone when the magnetic disc stops rotating as it was when it initially contacted the magnetic disc for landing.

6. The disc drive of claim 5 wherein the landing zone is adjacent to the takeoff zone.

7. A disc drive comprising:
   a magnetic disc having a recording zone within which data is recorded, a landing zone, and a separate takeoff zone, wherein the landing zone comprises a first band, and the takeoff zone comprises a second band having a different radii than the first band;
   means for rotating the magnetic disc;
   disc drive data head means for reading data from and writing data to the recording zone;
   actuator means for positioning the disc drive data head means with respect to the magnetic disc;
   sensing means for detecting the speed of rotation of the magnetic disc; and actuator control means for controlling the actuator means wherein in response to a stop disc command signal the actuator control means causes the actuator means to move the disc drive data head means adjacent the landing zone such that the disc drive data head means is in the same band when the magnetic disc stops rotating as it was when it initially contacted the magnetic disc for landing, and after starting the rotation of the magnetic disc the actuator control means causes the actuator means to move the disc drive data head means from the landing zone to the takeoff zone after a first preselected rotational speed of the magnetic disc is sensed by the sensing means wherein the disc drive data head means loses contact with the magnetic disc in the takeoff zone, the disc drive data head means only sliding on the surface of the magnetic disc radially when moving from the landing zone to the takeoff zone during the transition to takeoff.

8. The disc drive of claim 7 further including latching means to restrict movement of the disc drive data head means to an area of the disc containing the takeoff and landing zones during starting and after a predetermined rotational speed of the magnetic disc has been reached as the magnetic disc decelerates.

9. The disc drive of claim 8 wherein the latching means latches the disc drive data head means to the area of the magnetic disc containing the landing and takeoff zones when the magnetic disc stops rotation, and the latching means releases the disc drive data head means when a predetermined rotational speed of the magnetic disc is detected by the sensing means.

10. The disc drive of claim 9 wherein the landing zone is adjacent to the takeoff zone.

11. The disc drive of claim 7 further including a plurality of takeoff and landing zone pairs wherein each of the takeoff zones comprises a separate band and each of the landing zones comprises a separate band, and wherein the disc drive data head means is directed to initially contact a selected one of the plurality of landing zones for landing and for takeoff the disc drive data head means is moved to the takeoff zone associated with the selected one of the plurality of landing zones.

* * * * *

UNITED STATES PATENT AND TRADEMARK OFFICE
CERTIFICATE OF CORRECTION

PATENT NO. : 5,446,606

DATED : August 29, 1995

INVENTOR(S) : Mark Brunner, Jonathan Hall, Garry Korbel

It is certified that error appears in the above-indentified patent and that said Letters Patent is hereby corrected as shown below:

Col. 3, line 41, delete "10"

Col. 6, line 40, after "band", insert --,--

Signed and Sealed this

Twenty-sixth Day of December, 1995

Attest:

BRUCE LEHMAN

*Attesting Officer*  *Commissioner of Patents and Trademarks*